US008694234B2

(12) United States Patent
Mere et al.

(10) Patent No.: US 8,694,234 B2
(45) Date of Patent: Apr. 8, 2014

(54) SYSTEM ONBOARD AN AIRCRAFT CONNECTED WITH A FLIGHT PLAN

(75) Inventors: Jean-Claude Mere, Verfeil (FR); Julien Dramet, Toulouse (FR)

(73) Assignee: Airbus Operations S.A.S., Paris (FR)

( * ) Notice: Subject to any disclaimer, the term of this patent is extended or adjusted under 35 U.S.C. 154(b) by 463 days.

(21) Appl. No.: 13/015,008

(22) Filed: Jan. 27, 2011

(65) Prior Publication Data

US 2011/0208415 A1 Aug. 25, 2011

(30) Foreign Application Priority Data

Feb. 24, 2010 (FR) ..................................... 10 51317

(51) Int. Cl.
*G08G 5/00* (2006.01)

(52) U.S. Cl.
CPC ............ *G08G 5/0039* (2013.01); *G08G 5/0052* (2013.01)
USPC .......................................................... 701/123

(58) Field of Classification Search
CPC ........................... G05D 1/0055; G08G 5/0039
USPC .......................................................... 701/123
See application file for complete search history.

(56) References Cited

U.S. PATENT DOCUMENTS

| | | | | |
|---|---|---|---|---|
| 6,922,631 | B1 | 7/2005 | Dwyer et al. | |
| 7,366,591 | B2 * | 4/2008 | Hartmann et al. | 701/4 |
| 7,797,102 | B2 * | 9/2010 | Fortier | 701/467 |
| 8,285,427 | B2 * | 10/2012 | Rogers et al. | 701/3 |
| 8,412,392 | B2 * | 4/2013 | Jayathirtha et al. | 701/14 |

FOREIGN PATENT DOCUMENTS

| | | | |
|---|---|---|---|
| EP | 0 743 580 | A1 | 11/1996 |
| FR | 2 894 705 | A1 | 6/2007 |
| FR | 2 916 840 | A1 | 12/2008 |

OTHER PUBLICATIONS

French Preliminary Search Report issued Oct. 5, 2010, in Patent Application No. 1051317 (with English Translation of Category of Documents).
U.S. Appl. No. 13/017,509, filed Jan. 31, 2011, Mere, et al.

* cited by examiner

*Primary Examiner* — John R Olszewski
*Assistant Examiner* — Todd Melton
(74) *Attorney, Agent, or Firm* — Oblon, Spivak, McClelland, Maier & Neustadt, L.L.P.

(57) ABSTRACT

An evaluation method and an evaluation system onboard an aircraft in communication with a flight management system to access a flight plan stored in memory of the flight management system, where the flight plan defines a cruising level and a minimum fuel reserve to destination objective. The evaluation system comprises circuitry to calculate a fuel consumption deviation between flight at a selected cruising altitude level and flight at an altitude level initially planned by the flight plan, where the selected altitude level is lower than the altitude level initially planned, and to determine a climb limit point from the selected cruising altitude level as a function of the fuel consumption deviation and the minimum fuel reserve objective, where the climb limit point represents the last climb point respecting the minimum fuel reserve to destination objective; and interface circuitry to provide the climb limit point and anticipative information concerning the climb limit point.

13 Claims, 4 Drawing Sheets

SYSTEM ONBOARD AN AIRCRAFT CONNECTED WITH A FLIGHT PLAN

TECHNICAL FIELD

The present invention relates to the field of systems onboard aircrafts, and more particularly, an onboard evaluation system connected with the flight plan to evaluate the impact of an altitude change on fuel consumption.

BACKGROUND OF THE INVENTION

An aircraft generally has a flight management system (FMS) that allows the crew to record, before departure, a flight plan made up of a series of routing points. From this flight plan, the flight management system calculates and displays, on a screen, the different flight phases of the aircraft and in particular, the planned altitude level (or levels) during the en-route phase as well as data of a nature to be used by the crew such as the fuel reserve estimate.

In some cases, the air traffic controller may ask the pilot to change the altitude to fly at a lower altitude than that initially planned by the flight plan.

Currently, in case of flight at an altitude below the cruising altitude initially planned, the flight management system takes the hypothesis of imminently returning to the initial flight level to calculate the forecast amount of fuel remaining to the destination. However, keeping the flight at an altitude below the initially planned cruising altitude creates a consumption increase, and if the aircraft is not authorized to rise during a longer time than that taken into account by the flight management system, the prediction of the fuel quantity to destination is continuously updated. It decreases as the aircraft moves forward until it reaches the regulatory limits or those specified by the crew; the crew is therefore only warned that the fuel quantity regulatory limits are reached when the aircraft reaches the climb limit point towards the initially planned cruising altitude.

In order to anticipate the impact on the amount of fuel remaining to the destination of extended flight at an altitude below that initially planned for cruising, the crew can use a copy of the active flight plan ("temporary" or "secondary" flight plan) in which they modify the cruising altitude. The flight management system then recalculates the predictions on all of the new flight plan and in particular the amount of fuel to destination, which allows the crew to verify whether the amount of fuel to destination will be below the regulatory limits or those set by the crew. If this is the case, the crew must perform iterations on the position of a point for rejoining the initial altitude in the flight management system until the prediction of the amount of fuel to destination coincides with the regulatory limits (or those set by the crew). Due to the complete recalculation of the flight plan at each iteration, this process is extremely long, tiresome, and does not allow quick decision-making in response to instructions from the air traffic controller.

In fact, the crew often makes altitude changes requested by the air traffic controller without prior and precise knowledge of the impact on the amount of fuel remaining to the destination.

The object of the present invention is to propose a simple, precise onboard system resolving the aforementioned drawbacks, in particular allowing the crew to quickly assess the impact of flying at a lower level on the amount of fuel remaining to destination.

BRIEF DESCRIPTION OF THE INVENTION

The present invention is defined by an evaluation system onboard an aircraft connected with a flight plan defining a cruising level and a minimum fuel reserve to destination objective, including:

- calculating means for calculating a fuel consumption deviation between flight at a selected cruising altitude level and flight at an altitude level initially planned by the flight plan, said selected altitude level being lower than the altitude level initially planned,
- calculating means for determining a climb limit point from said selected cruising altitude level as a function of said fuel consumption deviation and said minimum fuel reserve objective, said climb limit point representing the last climb point respecting said minimum fuel reserve to destination objective, and
- interface means for providing said climb limit point and anticipatory information concerning said climb limit point.

This allows the aircraft's crew to quickly and easily evaluate, without altering the active flight plan, the impact of a limitation of the cruising altitude on the fuel to destination amount objective, and therefore on the aircraft's ability to fly under the planned flight level. More particularly, the climb limit point indicates to the crew the inability of the aircraft to continue the flight to the planned destination if the altitude selected on the instructions of the air traffic controller is kept as the cruising altitude. Thus, the crew can anticipate this delicate situation and can negotiate the return to the planned cruising level with the air traffic controller before reaching the limit point. Moreover, the determination of the climb limit point relies on an easy calculation of the fuel consumption and requires very little calculation time and memory capacity.

Advantageously, said anticipatory information includes an estimate of a maximum distance the aircraft can travel at said selected altitude level before having to return to said planned altitude level, a value of said planned altitude level to be returned to, and an estimate of the amount of fuel remaining to destination.

Thus, the information is provided to the crew automatically and in a way making it possible to make a quick decision when an altitude change request comes from the air traffic controller. More particularly, the crew knows the maximum distance the aircraft can travel at the selected altitude on the instructions of the air traffic controller before having to return to the initially planned flight level between the flight management system of the aircraft.

Advantageously, the calculating means are configured to recalculate the climb limit point for any modification of said flight plan.

This makes it possible to update the position of the climb limit point continuously and automatically.

According to another embodiment, the calculating means are configured to take into account an anticipatory climb towards said planned altitude level at said climb limit point and to iteratively re-estimate said climb limit point, and the calculating means are configured to continue the iteration until the available fuel reserves are below a determined percentage of a total amount of fuel necessary for the flight.

This makes it possible to refine the results at each iteration while guaranteeing a quick convergence.

Advantageously, the interface means are configured to provide each re-estimation of said climb limit point.

This makes it possible to present a result to the crew on the position of the limit point very quickly and to refine the position during the iterations rather than calculating a very precise position before presenting it to the crew, which would take much longer.

According to one specificity of the present invention, the interface means include:

output means for displaying a representation of said current climb limit point, and input means for allowing an aircraft crew to activate the climb to said current climb limit point. The current limit point can be shown on a screen by a dedicated symbol and the crew can then simply activate the climb to the proposed point by selecting said symbol.

Advantageously, the calculating means are configured to revise said flight plan as a function of said climb, and the interface means are configured to provide a revised flight plan.

Thus, the activation of the dedicated symbol makes it possible to automatically initiate a vertical revision of the flight plan.

Advantageously, the interface means are configured to allow the crew to create a new climb point and to move said new climb point along the flight plan, and the interface means are configured to indicate and update new anticipatory information concerning the new climb point as a function of its position.

The invention also targets an evaluation method connected to a flight plan defining a cruising level and a minimum fuel reserve to destination level, including the following steps:

calculating a fuel consumption deviation between a flight at a selected cruising altitude level and a flight at an altitude level initially planned by said flight plan, said selected altitude level being lower than said altitude level initially provided, determining a climb limit point from said selected cruising altitude level as a function of said fuel consumption deviation and said minimum fuel reserve object, said climb limit point representing the last climb point respecting said minimum fuel reserve to destination objective, and providing anticipatory information concerning said climb limit point.

The invention also concerns a computer program including instructions for carrying out the evaluation method according to the above method when it is executed by the calculating means of a system onboard the aircraft.

DETAILED DESCRIPTION OF SPECIFIC EMBODIMENTS

Figure 1:
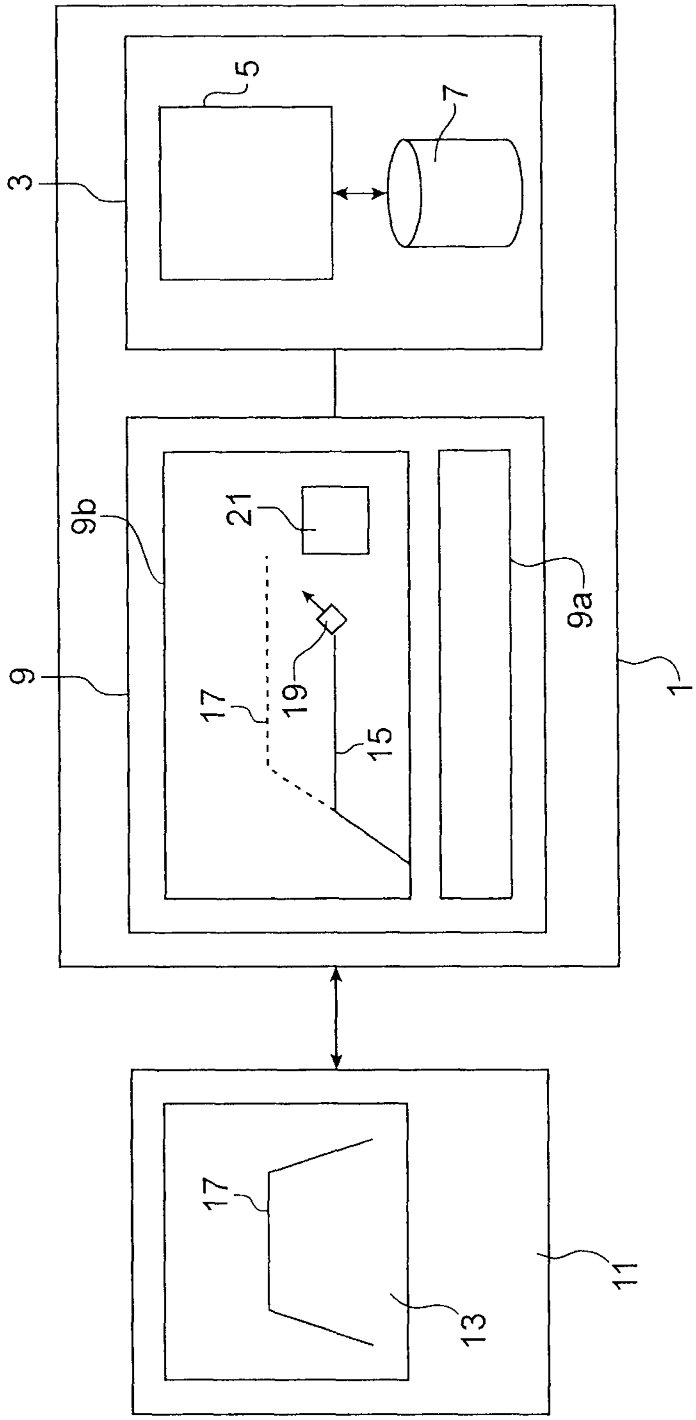
FIG. 1 shows an onboard evaluation system, according to the invention.

FIG. 1 diagrammatically illustrates an onboard evaluation system 1 that can be used by the crew to quickly assess the impact of flying below the initially planned cruising level on the amount of fuel remaining to destination, according to the invention. It will be noted that FIG. 1 is also an illustration of the evaluation method, according to the invention.

The onboard evaluation system 1 includes processing means 3 comprising calculating means 5 and storage means 7 as well as interface means 9 comprising input means 9*a* and output means 9*b*. The input 9*a* and output 9*b* means can be combined, at least in part, in an interactive viewing screen already existing onboard the aircraft. It will be noted that the onboard evaluation system 1 can be made up of a separate entity from the other systems of the aircraft. Alternatively, it can be comprised in whole or in part in another onboard system. For example, the onboard evaluation system 1 can be comprised in the flight management system 11 (FMS) of the aircraft.

Advantageously, the onboard evaluation system 1 is coupled to the flight management system 11 to be connected with the flight plan 13, which indicates the aircraft's trajectory. The flight plan 13 defines the different flight phases and, in particular, the altitude level(s) of the en-route phase 17 as well as the amount of fuel to destination according to the crew's specifications or regulatory limits.

The present invention concerns the case where the aircraft is forced to fly, on air traffic controller instructions, at a lower cruising altitude than that initially programmed into the flight management system 11. This altitude is selected (or chosen) by the crew on the FCU (flight control unit) interface of the aircraft's automatic pilot.

According to the invention, the calculating means 5 of the onboard evaluation system 1 are configured to calculate a fuel consumption deviation between flight at the selected altitude level 15 and flight at the altitude level 17 initially planned by the flight plan 13.

Taking into account the minimum fuel reserve objective according to the crew's specifications or the regulatory limits, the calculating means 5 determine a climb limit point 19 from the selected cruising altitude level 15 as a function of the fuel consumption deviation. The climb limit point 19 is determined so as to represent the last climb point respecting the minimum fuel reserve to destination objective.

The interface means 9 provide the aircraft's crew with the climb limit point 19 as well as anticipatory information concerning that point by displaying it on the output means 9*b* (a viewing screen).

Advantageously, the anticipatory information is for example displayed in an information box 21 near the climb limit point 19 and including an estimate of the maximum distance the aircraft can travel at the selected altitude level before having to return to the planned altitude level 17, a value of the planned altitude level 17 to be rejoined, and an estimate of the amount of fuel remaining to destination. This information can also include the arrival time at destination and the selected altitude level 15.

Moreover, the calculating 5 and interface 9 means are configured to review the flight plan 13 as a function of the climb, and consequently, the interface means 9 are configured to provide a revised flight plan.

Advantageously, the calculating means 5 are also configured to recalculate the climb limit point 19 for any alteration of the flight plan.

Figure 2:
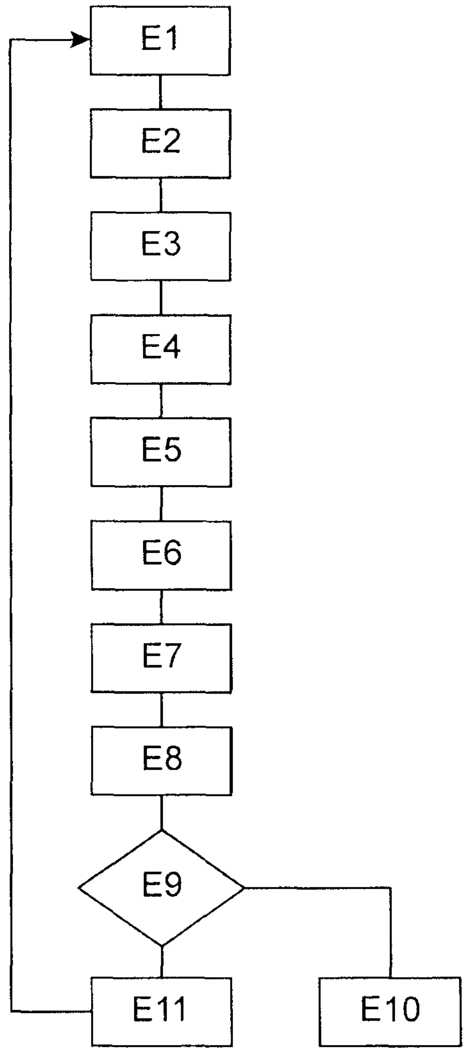
FIG. 2 is a flowchart illustrating the various steps used to determine the climb limit point, according to the invention.

FIG. 2 is a flowchart illustrating the different steps used to determine the climb limit point 19. These steps rely on the calculation of the fuel consumption per unit of distance for the initially planned cruising altitude level 17 (or cruising altitudes if the en-route phases includes several levels) and for the selected altitude level 15. The comparison of these consumption levels and taking into account the available fuel reserves will provide the flight cruising distance ratio for each of the altitudes. This calculation is very fast and is based on simplifications of the consumption estimate.

More particularly, in step E1, the calculating means 5 determine the different flight phases of the active flight plan 13.

In step E2, the calculating means 5 determine the amount of fuel consumed on the different cruise level-offs. Let $Q_1$, $Q_2$, . . . , $Q_n$ be the average consumption per unit of distance for the first, second, . . . , $n^{th}$ cruising level-offs, respectively, in tons per nautical mile.

In step E3, the calculating means 5 determine the different flight phases of a flight plan similar to the active plan but whereof the cruising altitude 17 is constantly equal to the selected altitude 15. Let Q be the average cruising consumption per unit of distance thus obtained, in tons per nautical mile.

In step E4, considering the distance of each level-off of the en-route phase of the active flight plan 13, the calculating means 5 determine the over-consumption $C_1$ that would be produced by the flight of these level-offs at the selected altitude (instead of the initially planned altitude):

$$C_1=(Q-Q_1)\times D_1, \ldots, C_N=(Q-Q_N)\times D_N$$

$D_1$, $D_2$, . . . , $D_N$, being the distances corresponding to the different level-offs of the en-route phase.

In step E5, the calculating means 5 gradually add up the over-consumptions $C_1$, $i\in[1;N]$ of the different level-offs, so as to determine level-off number M verifying the following inequation:

$$\sum_{i=1}^{M} Ci < \text{available reserves} < \sum_{i=1}^{M+1} Ci.$$

This inequation makes it possible to determine the level-off in which the climb limit point 19 is located. Moreover, it will be noted that the "available fuel reserves" are understood as being the rest of the fuel estimated by the flight management system 11 by considering the active flight plan 13 once the regulatory fuel reserves are removed.

In step E6, the calculating means 5 determine the distance $\Delta D_M$ that could be covered at the selected altitude level 15 in light of the available fuel reserves from which the over-consumption of the previous level-offs has been removed:

$$\Delta D_M = \frac{\text{available reserves} - \sum_{i=1}^{M-1} C_i}{Q - Q_M}$$

In step E7, the calculating means 5 then determine the climb point 19 that is located at a distance D from the input point of the first top of climb given by the following formula:

$$D = \sum_{i=1}^{M-1} Di + \Delta D_M$$

In step E8, the interface means 9 display the climb limit point 19 on the level-off corresponding to the selected altitude 15 (see FIG. 1).

Figure 3:
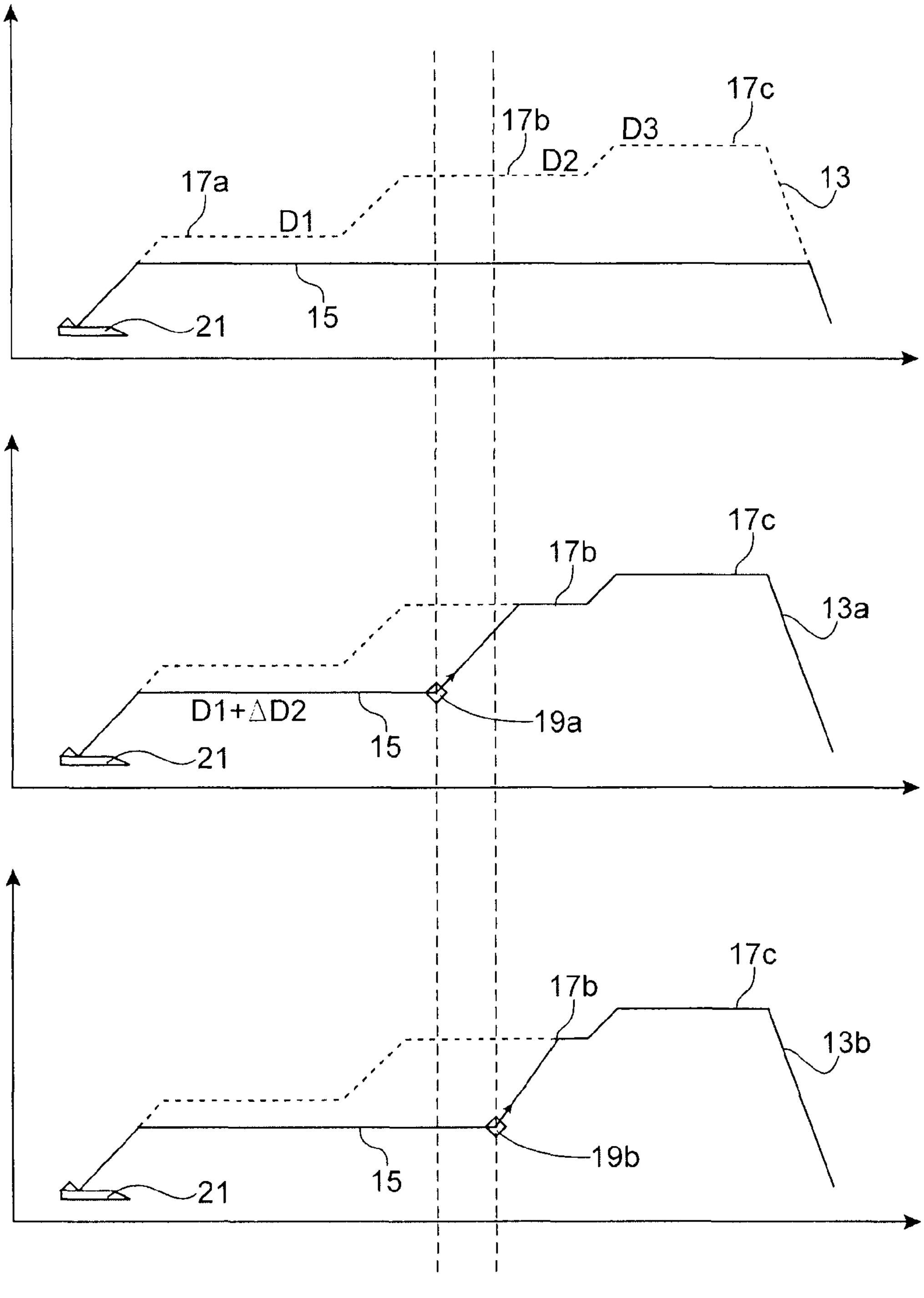
FIG. 3 illustrates flight plans determined by the onboard evaluation system.

FIG. 3 illustrates the active flight plan 13 of the flight management system 11 as well as other intermediate flight plans 13*a* and 13*b* determined by the onboard evaluation system 1 to calculate the climb limit point, according to the invention. The axis of the ordinates corresponds to the altitude and that of the abscissa corresponds to the distance relative to the ground along the flight plan. The current position of the aircraft is illustrated by an airplane symbol 21, references 17*a*, 17*b*, and 17*c* representing the first, second and third level-offs with lengths $D_1$, $D_2$, and $D_3$, respectively, of the en-route phase. Reference 15 represents the selected altitude level, and the climb limit point 19*a* or 19*b* is represented by a dedicated symbol, e.g. by a diamond with an up arrow.

More particularly, the intermediate flight plan 13*a* is the one used in step E7 to determine and display the climb limit point. According to this example, the selected altitude level 15 extends up to the climb limit point 19*a* that is situated at the second level-off 17*b* relative to the active flight plan 13 at a distance equal to $D_1+\Delta D_2$.

The preceding steps show that the principle of the present invention is to assess the maximum admissible length of the level-off that the aircraft can do at the altitude selected at the FCU. This assessment is done by estimating the over-consumption caused by this alteration of the flight profile and calculating the position of the climb limit point such that this over-consumption is just equal to the surplus available fuel (difference between the amount of fuel estimated by the flight management system to destination for the initially planned flight plan and the regulatory reserves or reserves specified by the crew).

Thus, the invention makes it possible to calculate and display the climb limit point 19*a* on the level-off corresponding to the selected altitude 15, automatically once the crew selects the altitude corresponding to the air traffic controller's instructions at the FCU; no other action is necessary.

Advantageously, the climb limit point 19*a* is automatically determined and displayed when the following two conditions are met. The first condition is the fact that the selected altitude level 15 is lower than that initially planned and higher than a minimum cruising altitude level in order to avoid pointless calculations while the aircraft is taking off from the airport. It will be noted that when there are several cruising altitude levels 17*a*, 17*b*, 17*c*, the lowest level 17*a* is taken into consideration. A second condition concerns the fact that if the aircraft continues to fly at a selected altitude level, the amount of fuel remaining to destination will become lower than the minimum fuel reserve.

The present invention thereby makes it possible to quickly display the climb limit point 19*a* on the level-off corresponding to the selected altitude 15.

Moreover, it will be noted that during the calculations of the preceding steps, the cost of the transitions between two level-offs has been taken into account in the climb and descent phases. However, these transitions take place at different places in the flight plan and more particularly at places where the aircraft is less loaded with fuel and where the consumption is therefore decreased. As a result, the determination of the climb limit point 19*a* to rejoin the initial altitude is based on a maximalist precautionary hypothesis where the fuel reserve to destination is in reality higher than the minimum reserve objective.

In order to refine the result, it is possible to use an iterative process while still providing the information quickly.

Advantageously, the calculating means 5 are configured to take into account an anticipatory climb towards the planned altitude level at the climb limit point 19*a* and to iteratively re-estimate and display a new climb limit point 19*b* for each new intermediate flight plan. It will be noted that the intermediate flight plan 19*b* is only used to calculate the limit point and it is not presented to the crew as long as the crew does not activate the climb.

The iteration continues until the "available reserves" of fuel are below a determined percentage of the total amount of fuel necessary for the flight. The determined percentage is defined so as to consider minimal fuel margins.

In other words, the convergence of the algorithm is obtained by the decrease of the impact of the transition between the selected altitude level and the initially planned altitude level on the amount of fuel as the aircraft becomes lighter.

More particularly, in step E9, the calculating means 5 verify whether the available fuel reserves are below the determined percentage of the total amount of fuel. If yes, the process is stopped (step E10) and if no, it continues to the following step E11.

In step E11, the calculating means 5 consider the new intermediate flight plan 13*a* obtained in step E8, then restart steps E1 to E9. Another new intermediate flight plan 13*b* will then be obtained in steps E7 and E8. More particularly, in step E8, the interface means provide each re-estimate of the climb limit point 19*b*. In this way, once they are calculated, and even before launching any additional iterations, the position of the climb limit point 19*b* as well as the estimate of the value of the amount of fuel remaining to destination, the value of the altitude to be rejoined (expressed in flight level) and, possibly, the arrival time at destination are displayed by the interface means 9.

This display can be done on existing interface means that allow the crew to view the vertical and lateral components of the flight plan used.

Advantageously, the display is interactive so as to allow the crew to evaluate the effect of a change of position of the climb point.

The crew can, according to a first possibility, ignore the display and then the symbol representing the limit point 19*b* remains displayed as long as the selected altitude, the active flight plan, or the flight parameters of the aircraft remain unchanged. The limit point is recalculated when one of these parameters is altered.

According to a second possibility, the crew can activate the climb towards the initial level at the proposed limit point 19*b*. The crew can, for example, activate the climb by selecting the limit point symbol, which creates a vertical revision of the active flight plan in the flight management system 11.

According to a third possibility, the crew can generate a vertical revision of the active flight plan by creating another position of the climb point where they wishes along the flight plan, in order to reassess the amount of fuel remaining to destination.

By knowing the average over-consumption on each level-off or segment of the initial flight plan ($C_i$ on segment i) created by a flight at the selected altitude level, the calculating means 5 are configured to deduce an approximation of the consumption gain.

Indeed, suppose that the climb limit point is initially situated on the $M^{th}$ cruising segment and the crew has moved the climb point on the $K^{th}$ segment, at a distance ΔD from the position of the limit point. The fuel reserve supplement ΔR obtained can then be expressed by the following formula:

$$\Delta R = \frac{\left(\Delta D - \sum_{i=K+1}^{M-1} Di\right)}{D_k} \times C_K + \sum_{i=K+1}^{M-1} Ci + \frac{\Delta D_M}{D_M} \times C_M$$

Figure 4:
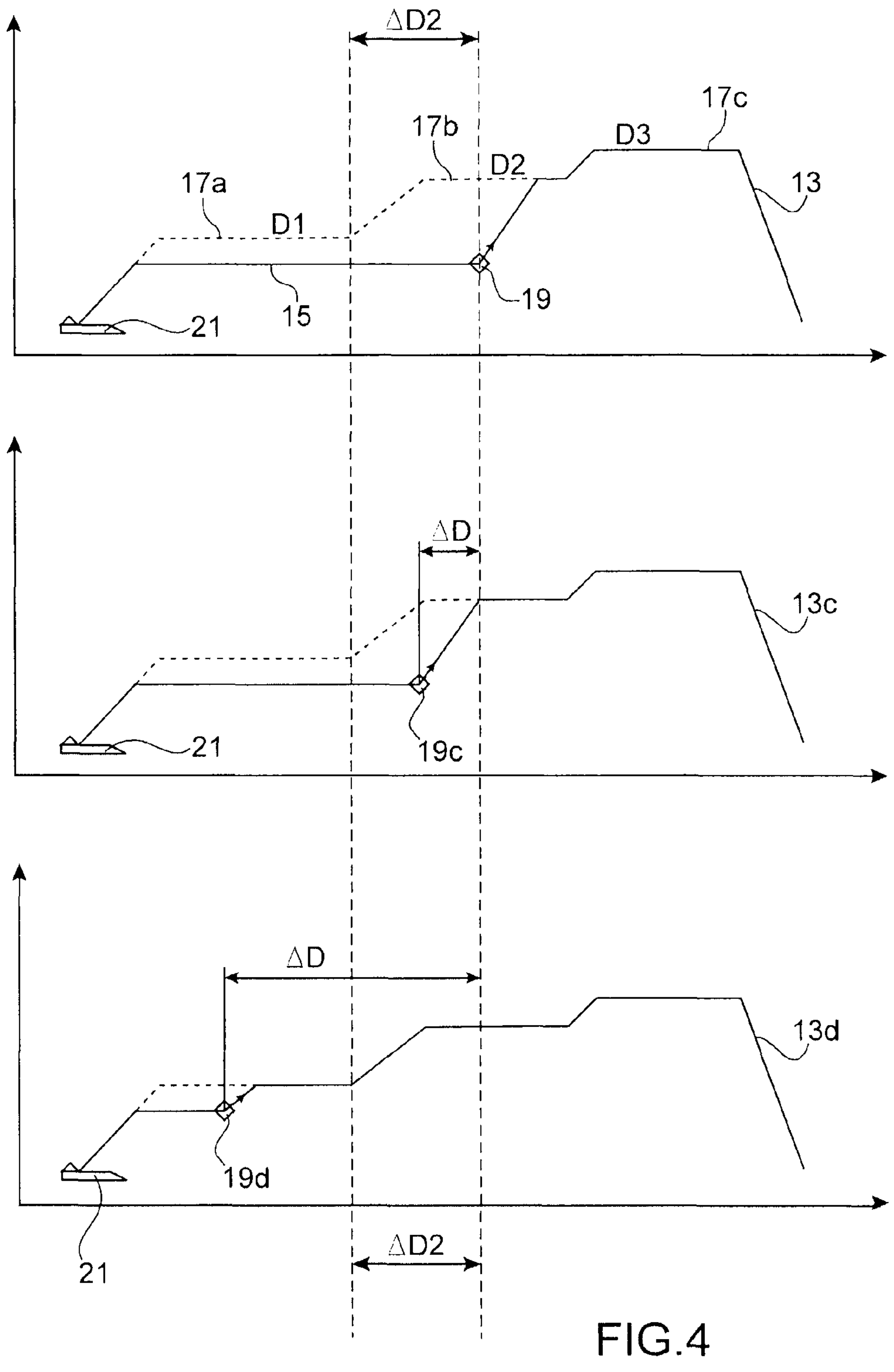
FIG. 4 illustrates two examples of evaluation of the effects produced during a change of position of the climb limit point.

FIG. 4 illustrates two examples of assessment of the effect of a change of position of the climb point.

Initially, the climb point 19 is situated on an initial flight plan 13 at the second level-off 17*b* (with length $D_2$) relative to the active flight plan (shown in dotted lines).

The first example shows, on the intermediate flight plan 13*c*, a movement ΔD of the climb point 19*c* but still on the second level-off 17*b*. In this case, the fuel reserve supplement ΔR1 is given by the following formula:

$$\Delta R1 = \frac{\Delta D}{D_2} \times C_2$$

The second example shows, on the intermediate flight plan 13*d*, a movement ΔD of the climb point 19*d* on the first level-off (with length $D_1$). In this case, the movement is made up of a first movement $\Delta D_2$ on the second level-off 17*b* and a second movement $\Delta D - \Delta D_2$ on the first level-off 17*a*. The fuel reserve supplement ΔR2 is then given by the following formula:

$$\Delta R2 = \frac{\Delta D - \Delta D_2}{D_1} \times C_1 + \frac{\Delta D_2}{D_2} \times C_2$$

Thus, according to this third possibility, the crew can define, on the interface means 9, a new climb point by moving the one initially proposed.

Advantageously, the interface means 9 are configured to allow the crew to create the new climb point and then move it along the flight plan. The interface means 9 are also configured to indicate and update new anticipatory information concerning the new climb point 19*c* or 19*d* as a function of its position. This can advantageously be used to position the new climb point, where the crew wishes, as a function of the anticipatory information provided. Once the crew has set the position of the new point, the system 1 activates a vertical revision of the active flight plan on which the flight management system 11 redoes a predictive calculation.

It will be noted that the initial climb limit point 19 remains unchanged as long as the flight plan 13 or selected altitude level is not touched and it remains displayed continuously. On the other hand, the crew has the ability to create the new climb point 19*c* or 19*d* (e.g. through a sort of "copy-paste" of the initial climb limit point 19 at another point of the flight plan).

Initially, the new climb point 19*c* or 19*d* is superimposed on the initial climb limit point 19 and the crew can then freely move the new point along the flight plan. The new climb point 19*c* or 19*d* and the initial climb limit point 19 are displayed simultaneously, but with different symbols and/or colors. This allows the crew to generate a vertical revision of the flight plan by specifying a position of the climb point where it wishes along the flight plan. Once the position of the new climb point is specified, the calculating means 5 recalculate the estimate of the amount of fuel remaining to destination and the interface means 9 re-update the display of the relative result at that new point.

The principle of this calculation is to take into account the position variation of the symbol for the climb point 19 in order to deduce the amount of additional fuel to destination. As a result, the interface means 9 are configured to return the distance, along the flight plan, between the initially calculated climb point and the new chosen point. It will be noted that in order to avoid making the display too heavy, only two climb points are displayed simultaneously.

Moreover, the processing means 3 of the onboard evaluation system 1 can comprise a computer program (recorded, for example, in the storage means 7) comprising code instructions for carrying out the method according to the invention when the computer program is executed by said processing means.

As a result, the invention also concerns a computer program, capable of being carried out in the onboard evaluation system, said program including code instructions adapted to the implementation of a method according to the invention as described above.

The invention claimed is:

1. An evaluation system onboard an aircraft in communication with a flight management system to access a flight plan stored in memory of the flight management system, the flight plan defining a cruising level and a minimum fuel reserve to destination objective, the evaluation system comprising:

calculation circuitry configured to calculate a fuel consumption deviation between flight at a selected cruising altitude level and flight at an altitude level initially planned by the flight plan, the selected altitude level being lower than the altitude level initially planned, determine a climb limit point from the selected cruising altitude level as a function of the fuel consumption deviation and the minimum fuel reserve to destination objective, the climb limit point representing a last climb point respecting the minimum fuel reserve to destination objective; and interface circuitry configured to output data regarding the climb limit point and anticipatory information regarding the climb limit point.

2. The onboard evaluation system according to claim 1, wherein the anticipatory information includes an estimate of a maximum distance the aircraft can travel at the selected altitude level before having to return to the initially planned altitude level, a value of the initially planned altitude level to be returned to, and an estimate of an amount of fuel remaining to destination objective.

3. The onboard evaluation system according to claim 1, wherein the calculation circuitry is configured to recalculate the climb limit point for any modification of the flight plan.

4. The onboard evaluation system according to claim 3, wherein the calculation circuitry is configured:

to take into account an anticipatory climb towards the initially planned altitude level at the recalculated climb limit point and to iteratively re-estimate the climb limit point, and to continue the iteration until available fuel reserves are below a determined percentage of a total amount of fuel necessary for the flight.

5. The onboard evaluation system according to claim 4, wherein the interface circuitry is configured to provide each re-estimation of the climb limit point.

6. The onboard evaluation system according to claim 1, wherein the interface circuitry is configured:

to display a representation of the climb limit point, and to allow an aircraft crew to activate a climb associated with the climb limit point.

7. The onboard evaluation system according to claim 6, wherein the calculation circuitry is configured:

to revise the flight plan as a function of the activated climb, and the interface circuitry is configured:

to provide a revised flight plan.

8. The onboard evaluation system according to claim 7, wherein the revised flight plan is provided to the crewperson only after the climb is activated.

9. The onboard evaluation system according to claim wherein the interface circuitry is configured:

to allow a crewperson of the aircraft to create a new climb limit point and to move the new climb limit point along the flight plan, and to indicate and update new anticipatory information concerning the new climb limit point as a function of its position.

10. The onboard evaluation system according to claim 1, wherein the climb limit point is automatically calculated and displayed when the following conditions are satisfied:

the selected altitude level is lower than the altitude level initially planned and higher than a minimum cruising altitude level, and if the aircraft continues to fly at the selected altitude level, the amount of fuel remaining to object destination will become lower than the minimum fuel reserve.

11. The onboard evaluation system according to claim 1, wherein the climb limit point is automatically calculated and displayed when the selected altitude level is lower than the altitude level initially planned and higher than a lowest predetermined cruising altitude level of a plurality of predetermined cruising altitude levels in the flight plan.

12. An evaluation method using a flight plan stored in memory of the flight management system, the flight plan defining a cruising level and a minimum fuel reserve to destination objective, the method comprising:

calculating, using a processor, a fuel consumption deviation between flight at a selected cruising altitude level and flight at an altitude level initially planned in the flight plan, the selected altitude level being lower than the altitude level initially planned;

determining, using the processor, a climb limit point from the selected cruising altitude level as a function of the fuel consumption deviation and the minimum fuel reserve to destination objective, the climb limit point representing a last climb point respecting the minimum fuel reserve to destination objective; and providing, using interface circuitry, anticipatory information regarding the climb limit point.

13. A non-transitory computer-readable storage medium storing computer-readable instructions that, when executed by a computer, cause the computer to perform a method comprising:

calculating a fuel consumption deviation between flight at a selected cruising altitude level and flight at an altitude level initially planned in a flight plan defining a cruising level and a minimum fuel reserve to destination objective, the selected altitude level being lower than the altitude level initially planned;

determining a climb limit point from the selected cruising altitude level as a function of the fuel consumption deviation and the minimum fuel reserve to destination objective, the climb limit point representing a last climb point respecting the minimum fuel reserve to destination objective; and providing anticipatory information regarding the climb limit point.

* * * * *